United States Patent [19]

Erickson

[11] 4,286,185

[45] Aug. 25, 1981

[54] OIL DRYING SYSTEM FOR MOTORS

[75] Inventor: John W. Erickson, Huntington Beach, Calif.

[73] Assignee: Kobe, Inc., City of Commerce, Calif.

[21] Appl. No.: 50,916

[22] Filed: Jun. 21, 1979

[51] Int. Cl.³ .............................................. H02K 5/10
[52] U.S. Cl. ...................................................... 310/87
[58] Field of Search ..................................... 310/87, 90

[56] References Cited

U.S. PATENT DOCUMENTS

| | | | |
|---|---|---|---|
| 1,842,457 | 1/1932 | Mendenhall et al. ................... | 310/87 |
| 1,989,104 | 1/1935 | Mendenhall et al. ................... | 310/87 |
| 1,989,349 | 1/1935 | Coberly .............................. | 310/87 X |
| 1,989,548 | 1/1935 | Coberly .............................. | 310/87 X |

Primary Examiner—Donovan F. Duggan
Attorney, Agent, or Firm—William C. Norvell, Jr.

[57] ABSTRACT

A circulation and drying system is provided for the lubricating oil of a submersible motor of the type employed in pumping oil wells. The lubricating system provides a forced, closed system circulation of the lubricating oil for a submersible motor, including an expandable chamber at the bottom portion of the motor for collection of water therein and provision of a hygroscopic material in the circulating path of the motor oil to dry the oil before it passes into contact with the bearing and/or electrical parts of the motor.

2 Claims, 1 Drawing Figure

U.S. Patent
Aug. 25, 1981
4,286,185
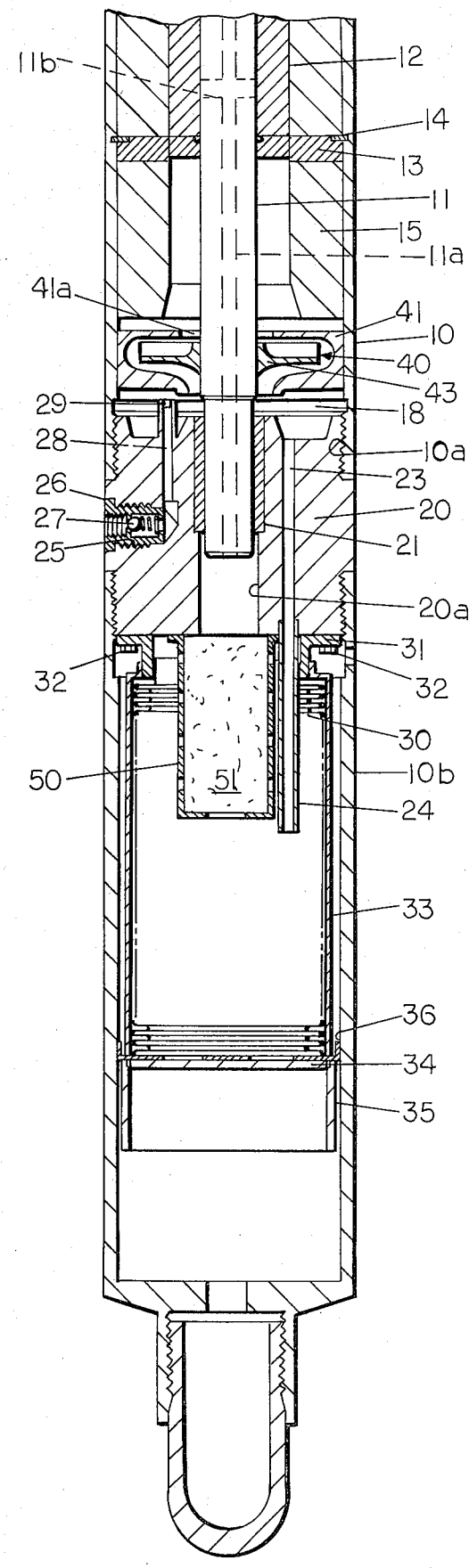

OIL DRYING SYSTEM FOR MOTORS

BACKGROUND OF THE INVENTION

1. Field of the Invention

The invention is directed to lubrication of the bearings of a submersible motor of the type employed in pumping oil wells.

2. Description of the Prior Art

Submersible electric motors for operating the submerged pump of an oil well have been heretofore widely utilized. The lubricating systems for the bearings of such motor provide for the circulation of the lubricating fluid from a reservoir disposed at the bottom of the motor and upwardly through a hollow motor shaft to the motor bearings. With such prior art constructions, regardless of the care taken to provide adequate sealing of the power shaft end of the motor, and the electrical power connections entering the motor, it has been observed that over a period of time that a significant amount of water, which constitutes a significant portion of the fluids pumped from an oil well, would seep into the interior of the motor housing, become intermingled with the lubricating oil and would deposit on the stator windings of the motor, thus leading to dielectric failure of such windings and the premature failure of the electric motor.

SUMMARY OF THE INVENTION

In the present lubricating system, a pump is employed within the motor housing to impart a positive pressure to the lubricating fluid being supplied to the electric motor bearings. With such lubricating fluid flowing under a positive pressure, it then becomes possible to dispose a mass of hygroscopic material in the flow path of the circulating lubricating fluid to effectively remove any entrained moisture from the circulating lubricating fluid. By locating the hygroscopic mass within the storage reservoir normally provided for the lubricating fluid, it is assured that the entrapped water will be trapped within the reservoir and collected at the bottom thereof. Furthermore, the reservoir has an expandable wall to provide increased volume to accommodate fluids heating into the lubricating system.

Accordingly, it is an object of this invention to provide an improved self-contained lubricating system for the bearings of a submersible electric motor of the type employed to operate oil well pumps.

A particular object of this invention is to provide a submersible electric motor lubricating system wherein a positive pressure is imparted to the lubricating fluid and the fluid is forced to pass through a mass of hygroscopic material to remove all entrained moisture from the lubricating fluid before it comes in contact with the bearings and/or electrical parts of the electric motor.

Other objects and advantages of the invention will be apparent to those skilled in the art from the following detailed description.

BRIEF DESCRIPTION OF THE DRAWING

The single FIGURE of the drawing represents a schematic vertical sectional view of a submersible electric motor containing a lubricating system constructed in accordance with this invention.

DESCRIPTION OF THE PREFERRED EMBODIMENTS

Referring to the drawing, numeral 10 represents the external housing of a submersible motor unit. Such motor unit, which can be of significant axial length, for example up to twenty-five or more feet, comprises a shaft 11 concentrically disposed within housing 10 and supported therein for rotation in conventional fashion by a plurality of bearings 12, of which only one is shown. Bearing 12 is mounted in a stationary position relative to the housing 10 by a spider shaped retainer ring 13 which is in turn axially secured to the interior wall of housing 10 by an annular retainer element 14. Shaft 11 is provided with an axial bore 11a which communicates with radially extending passages 11b adjacent the interior surface of each bearing 12 and these passages are employed to supply lubricating fluid to the cooperating bearing surfaces.

The stator laminations and windings of the motor are schematically illustrated at 15 and it will be understood that a large number of rotor sections (not shown) are keyed to the shaft 11 and cooperate with the electrically energized stator windings 15 to drive the shaft 11 and the pumping apparatus that is conventionally mounted on the upper end of the shaft 11 (not shown) which projects out of the housing 10. Conventional seals are, of course, provided for the projecting end of the shaft 11 and also for the power input cable (not shown) by which the stator windings 15 are energized. Regardless of the efficiency of such seals, it has been observed that over a period of time a certain amount of the well fluid, which contains significant quantities of water, will work its way through the seals and into the interior of the motor housing 10.

The bottom end of motor shaft 11 projects into and is journaled by a cylindrical body 20. The body 20 is threadably engaged at its upper end with a threaded lower end 10a of the motor housing 10 and at its lower end with a cylindrical housing extension 10b. A journal-type bearing 21 is axially disposed in a central bore 20a provided in the body 20 and provides bearing support for the lower end of motor shaft 11.

Within the lower housing extension 10b of motor housing 10, there is mounted a bellows 30 of flexible material which, in its unexpanded position, fills only a small portion of the chamber defined by housing extension 10b. Bellows 30 can be suitably mounted to the bottom end face of the body 20 by an intermediate annular flanged member 31 and a plurality of bolts 32. A protective sleeve 33 is provided around the outer periphery of the bellows 30 and is secured to flanged member 31. A guideplate structure 34 is secured to the bottom end of the bellows 30. Guideplate 34 includes a downwardly projecting rigid annular guide portion 35 which is of significantly smaller diameter than the interior of the housing extension 10b and a relatively thin-walled upwardly projecting, flexible annular guide 36 which is disposed in close proximity to the interior wall of the housing extension 10b.

In any event, the bellows 30 provides a storage chamber for lubricating oil for the motor which can significantly expand in volume to accommodate either pressure changes in the oil due to its inherent rise in temperature under operating conditions, or increase in the total volume of the oil system due to well fluids, such as water leaking into the system.

In the prior art arrangements, the lubricating oil entirely filled the space defined by the shaft lubricating axial bore 11a, the bearing lubricating passages 11b, and the storage chamber defined by the bellows 30. Circulation of the oil to the bearings was induced by the pumping action of the radially extending portions 11b of the shaft fluid passages. The pressure involved in such pumping operation is, of course, very small because of the relatively small radius of the pumping passages.

In accordance with this invention, a conventional centrifugal-type pump 40 is disposed between the lower end of the motor stator windings 15 and the top end of the cylindrical body 20. Pump 40 comprises an annular bowl or stator unit 41 which is snugly engaged with the interior wall of housing 10 and is therefore stationary. A rotor or impeller portion 43 of the pump 40 is keyed to the shaft 11, and the entry to the pump 40, defined by an annular passage 41a, permits all lubricating fluid flowing downwardly from the motor components, after having been fed to the bearings 12, to enter and be pressurized by the rotating action of the pump rotor 43. The stator unit 41 converts the radial velocity of the pumped fluid into a pressure head and discharges it in an annular axial flow pattern along the lower portions of the motor shaft 11, and into a chamber 18 defined between the pump 40 and the cylindrical body 20. An axially extending passage 23 is provided in body 20 to convey the pressurized lubricating fluid downwardly into the bellows reservoir 30 and it is discharged at a central level of such reservoir by an extension tube 24.

Around the axial bore 20a provided in the body 20, which is the output of the fluid reservoir, there is suitably mounted a perforated cup 50 within which a mass 51 of hygroscopic material, such as a silica gell is mounted. The hygroscopic material is thus disposed directly in the fluid flow path of the pressurized lubricating fluid which is forced upwardly through the hollow motor shaft 11 to the various bearings 12.

The lubricating system is filled with fluid through a suitable filler port, such as a radial port 25 provided in the cylindrical body 20. Port 25 is provided with a hollow threaded plug 26 containing a check valve 27 at its inner end to prevent any outward flow of lubricating fluid through the port and communicates with chamber 18 through a pipe 28 having a filter 29 at its upper end. An air escape valve (not shown) is provided at the upper end of the pump housing 10 so that the entire housing, including the reservoir chamber defined by bellows 30, can be filled with lubricating oil at the well surface and then sealed by the plug 26 and check valve 27.

The operation of the described apparatus is thus readily apparent. The lubricating fluid is drawn into the annular passage 41a of the pump 40 and pressurized by such pump to a level above that of the fluid in the rest of the system. The pressured fluid flows downwardly through the passage 23 and the tube 24 into the reservoir chamber defined by the bellows 30. From this chamber, the oil flows upwardly through the hygroscopic mass 51 which effects the removal of all moisture from the lubricating fluid. The upwardly flowing fluid then enters the axial bore 11a of the shaft 11 and is distributed to the various bearings through the radial passages 11b.

The water that is eliminated from the lubricating fluid by these devices is trapped inside the bellows 30 and, due to gravity, settles into the bottom of this container.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. In a submersible oil well pump having an electric motor housing insertable into the bottom of a well casing and containing a hollow rotatable shaft projecting out of the housing through a fluid seal and bearings for supporting the shaft in the housing, a closed lubricating system for the bearings in the motor housing, comprising: a lubricating oil reservoir formed in said housing and having an oulet communicating with the hollow bore in the motor shaft; a plurality of radial passages formed in the shaft communicating between the motor bearings and the shaft bore; pump means mounted on the shaft said pump means having an inlet constructed and arranged to receive spent lubricating oil flowing out of the bearings; conduit means connecting the pressured fluid outlet of said pump means with the interior of said lubricating oil reservoir; and hygroscopic filter means disposed in said reservoir and connected in the flow path of the pressurized lubricating oil toward the bearings, whereby water is removed from the circulating oil, said oil reservoir, pump means and all fluid passages and conduit means being initially filled with lubricating oil, and said reservoir having an expandable wall to provide increased volume for fluid leaking through the fluid seal into said reservoir.

2. The lubricating system defined in claim 1 wherein said lubricating oil reservoir comprises a cylindrical member having its cylindrical wall formed of flexible material and having a bellows configuration to permit expansion of the reservoir volume.

* * * * *